H. C. BOGGS.
LEVER VALVE LOCK.
APPLICATION FILED JULY 24, 1918.

1,363,225.

Patented Dec. 28, 1920.

H. C. Boggs, Inventor

UNITED STATES PATENT OFFICE.

HENRY C. BOGGS, OF SHAMROCK, OKLAHOMA.

LEVER VALVE-LOCK.

1,363,225.     Specification of Letters Patent.     Patented Dec. 28, 1920.

Application filed July 24, 1918. Serial No. 246,534.

*To all whom it may concern:*

Be it known that I, HENRY C. BOGGS, a citizen of the United States, residing at Shamrock, in the county of Creek, State of Oklahoma, have invented a new and useful Lever Valve-Lock, of which the following is a specification.

It is the object of this invention to provide a simple means whereby a stem which operates a valve may be held against movement regardless whether the stem moves lengthwise when it is rotated to operate the valve, or is held against longitudinal movement when it is rotated to actuate the valve.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
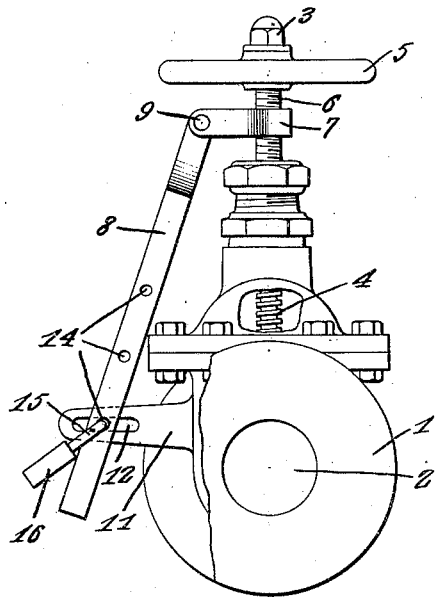
Figure 2:
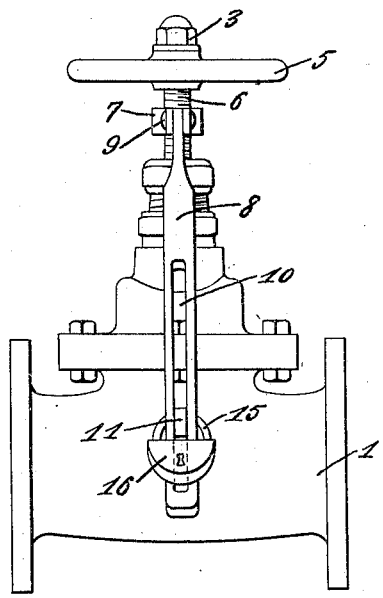

Figure 1 shows in end elevation, a valve casing wherewith the device forming the subject matter of this application has been assembled, parts being broken away; Fig. 2 is a side elevation of the structure shown in Fig. 1.

In carrying out the invention, there is provided a valve casing 1 in which operates a valve 2. The numeral 3 marks a stem held for rotation in the valve casing 1, but not movable longitudinally therein, the stem being threaded into the valve 2, as indicated at 4. A wheel or other operating means, denoted by the numeral 5, is mounted on the exposed end of the stem 3. Between the wheel 5 and the casing 1, the stem 3 is threaded as shown at 6, the threads 6 and 4 being opposite threads. A nut 7 is mounted on the threaded portion 6 of the valve stem 3. A lever 8 is united with the nut 7 by means of a pivot element 9 and has a slot 10 adapted to receive a lug 11 projecting outwardly from the valve casing 1. The lug 11 has a slot 12 and there are openings 14 in the lever 8.

By means of the wheel 5, the stem 3 may be raised and lowered, to manipulate the valve 2. When the valve 2 is in the desired position, the lever 8 is swung downwardly until the lug 11 is received in the slot 10. The shackle 15 of the padlock 16 is then passed through one of the openings 14 in the lever 8 and through the slot 12 in the lug 11. If one of the openings 14 does not happen to be alined with the slot 12, then the shackle 15 of the padlock 16 may be placed in the slot 12, in front of the lever 8. Generally, however, it is possible, by rotating the nut 7 on the threaded portion 6 of the valve stem 3, to position one of the openings 14 in such a way that it will coincide with the slot 12 to receive the shackle 15 of the padlock 16. Since the stem 3 is threaded in one direction, as shown at 4, into the valve 2 and is threaded in an opposite direction, as shown at 6, to coöperate with the nut 7, the stem will be locked against rotation, when the parts are arranged as shown in Figs. 1 and 2.

Having thus described the invention, what is claimed is:—

In a device of the class described, a valve casing; a valve stem in the casing and having oppositely threaded portions, one of which threaded portion constitutes a valve operating means; a nut on the other of said threaded portions of the stem; a lever; means for connecting the lever to the nut and means for connecting the lever to the casing, one of said means being a pivot element and the other of said means being a lock.

In testimony that I claim the foregoing as my own, I have hereto affixed my signature in the presence of two witnesses.

HENRY C. BOGGS.

Witnesses:
F. E. HILL,
T. G. PAYTON.